Oct. 5, 1954     F. C. WALLACE     2,690,803
END WIRE FREQUENCY MEASURING AND CUTTING JIG
Filed March 13, 1952     2 Sheets-Sheet 1
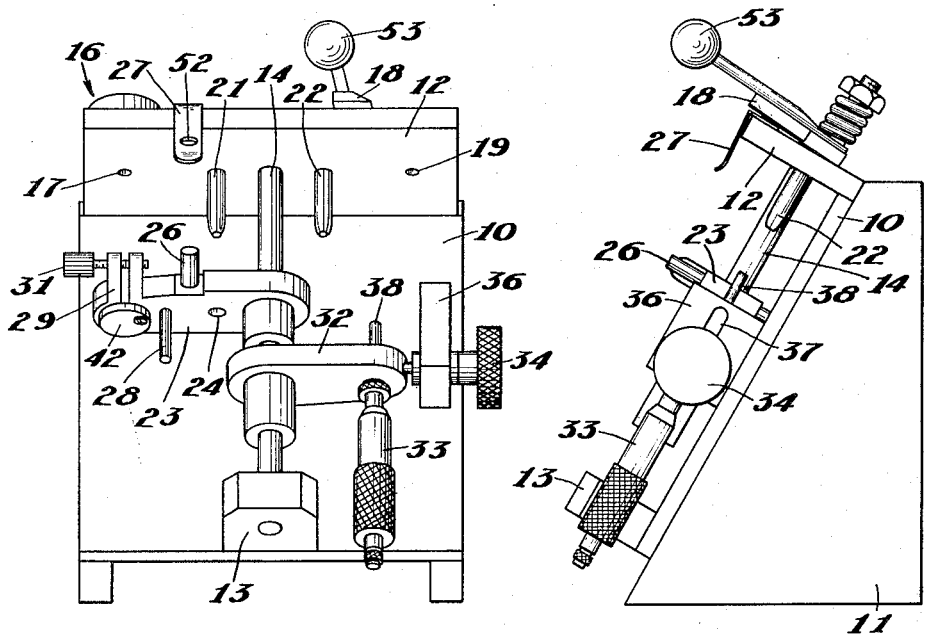
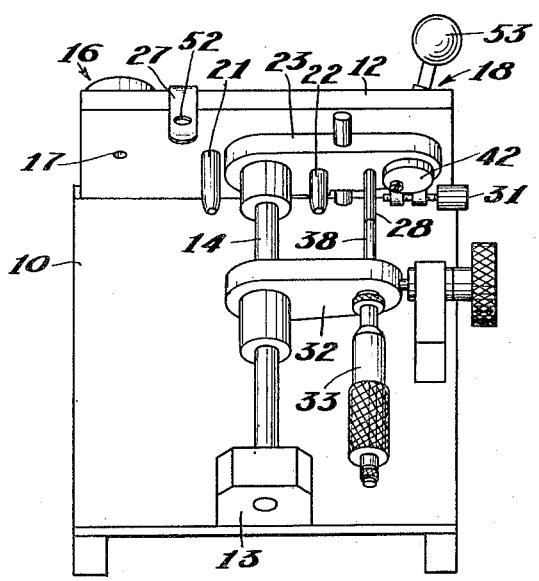
INVENTOR.
FRANK C. WALLACE
BY
ATTORNEY Oct. 5, 1954

F. C. WALLACE 2,690,803

END WIRE FREQUENCY MEASURING AND CUTTING JIG

Filed March 13, 1952

INVENTOR.
FRANK C. WALLACE
BY
Marvin Moody
ATTORNEY

Patented Oct. 5, 1954

2,690,803

UNITED STATES PATENT OFFICE 2,690,803

END WIRE FREQUENCY MEASURING AND CUTTING JIG

Frank C. Wallace, North Hollywood, Calif., assignor to Collins Radio Company, Cedar Rapids, Iowa, a corporation of Iowa Application March 13, 1952, Serial No. 276,398

3 Claims. (Cl. 164—44)

1

This invention relates in general to frequency measuring means and in particular to an apparatus for measuring and changing frequency until the correct frequency is obtained.

In electromechanical filters, such as described in the copending application entitled "Mechanical Filters," Serial No. 248,011, filed on September 24, 1951, it is important to have an end wire assembly which is tuned to a particular frequency. The end wire assembly consists of the end disc of the filter and the driving wire.

It is an object of this invention, therefore, to provide a fixture for measuring the frequency and cutting the end of the driving wire of the end section until the correct frequency is obtained.

Further objects, features, and advantages of this invention will become apparent from the following description and claims when read in view of the drawings, in which:

Figure 1 is a generally top view of the fixture of this invention.

Figure 2 is a side view.

Figure 3 is a generally top view illustrating the fixture in the cutting position.

Figure 4:
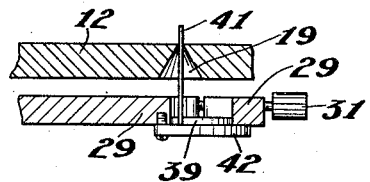
Figure 4 is a detailed view of the disc holding portion.

As pointed out in the co-pending application, Serial No. 248,011, an electromechanical filter may be constructed by mounting a plurality of metal discs with longitudinal supporting wires attached to their peripheries. If one of the end discs is exicted at a frequency which is in the band pass of the filter, the last disc will also be excited at the same frequency. As shown in the referenced application, one end disc is excited and energy is removed from the opposite end disc by attaching wires to their peripheries.

The length of end wires is critical and they must be carefully tuned.

The present apparatus provides means for tuning an end disc and wire assembly.

Figure 1 illustrates a plate 10 which, as shown in Figure 2, has attached at either side triangularly shaped supporting members 11. An upwardly extending plate 12 is mounted transversely of plate 10.

Attached to the lower end of plate 10 is an upright 13 and a shaft 14 is mounted between the upright 13 and the plate 12. A frequency measuring assembly, designated generally as 16, is attached to one edge of the plate 12 in alignment with an opening 17 formed through the plate.

2

A cutter 18 is attached to the other side of the plate and passes over an opening 19 formed through the plate 12. A pair of extending guides 21 and 22, respectively, are attached to the plate 12.

A disc holding assembly 23 is slidably mounted on the shaft 14 and has an opening 24 through which the guides 21 and 22 may be received. An upwardly extending pin 26 is attached to the member 23 and is engageable with a detent 27 attached to the plate 12 when the member 23 is in the left position relative to Figure 1. This is the frequency measuring position.

A second pin 28 is attached to the rear of the member 23. A disc assembly holding portion 29 is attached to the outer end of member 23. A thumb screw 31 is supported through the portion 29 to clamp the discs.

A micrometer holding assembly 32 is slidably mounted on the shaft 14 behind the member 23 and has a micrometer 33 attached to the outer edge thereof. A thumb screw 34 is adjustable in a slot 37 relative to an upright 36 which is mounted to the plate 10.

The end of pin 28 which is attached to the member 23 is engageable with the end 38 of the micrometer to position it when in the cutting position such as shown in Figure 3.

Figure 4 illustrates the disc holding portion 29 with a disc 39 mounted therein and with the end wire 41 attached to the disc 39. It is to be noted that the disc holding portion 29 has a plate 42 attached to its rear to prevent the disc 39 from falling through when the thumb screw 31 is loose.

Figure 5:
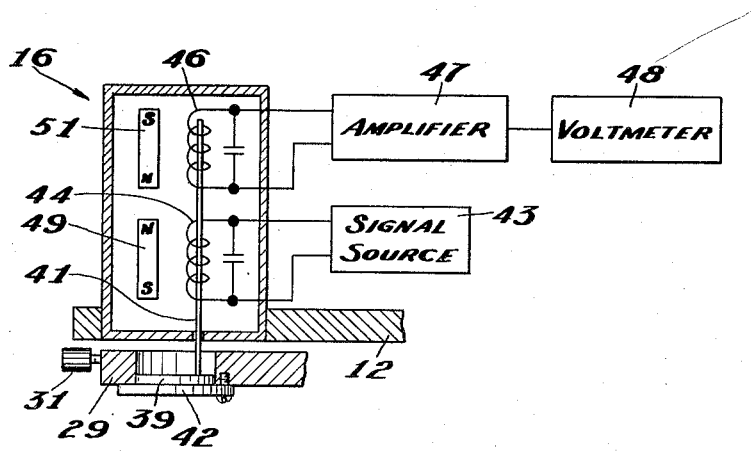
Figure 5 is a detailed view of the frequency measuring portion.

Figure 5 illustrates the frequency measuring apparatus which comprises a signal source 43 which produces a variable frequency output that is supplied to an inductance coil 44 through which the wire 41 extends. A second coil 46 is attached to an amplifier 47 and a voltmeter 48. Biasing magnets 49 and 51, respectively, are mounted adjacent coils 44 and 46 to bias them. It is to be realized, of course, that the rod 41 is constructed of magnetostrictive material so that it will receive energy from coil 44 and couple energy to coil 46.

In operation, the disc 39 with the wire 41 is placed in the disc holding portion 29 and the member 23 is pivoted to the left as shown in Figure 1 and pushed upwardly until the pin 26 is received in the opening 52 formed in the member 27, making sure that the wire 41 extends through the opening 17 into the frequency measuring means 16.

The thumb screw 31 is left loose so that no dampening of the disc 39 occurs. The signal source 43 is varied in frequency until the voltmeter 48 reads a maximum which indicates the resonant frequency of the disc and rod assembly. If this frequency is lower than the desired frequency, the member 23 is moved downwardly off the guide 21 by lifting the member 27 so as to free pin 26 and pivoted to the right, as shown in Figure 3.

The thumb screw 31 is tightened and the member 32 is pushed upwardly until the thumb screw 34 is at the end of slot 37. It is then tightened and the micrometer 33 adjusted until the desired length of the rod extends through the opening 19 and past the cutter 18.

It is to be realized that the member 23 is placed in the correct longitudinal position by the micrometer 33 due to the engagement of the rods 28 and 38. After the correct setting has been obtained, the cutter 18 may be actuated by turning the handle 53.

The thumb screw 34 is then loosened to allow the members 32 and 23 to back away from the cutter and off guide 22 to return to the frequency measuring position. The thumb screw 31 is loosened and the frequency is checked again. This operation may be continued until the exact frequency is obtained. It is to be realized, of course, that if the wire 41 is too short, a higher than desired frequency will be obtained, and the wire will have to be discarded and a longer wire attached to the disc.

It is seen that this apparatus provides means for very accurately adjusting the frequency of an end wire and disc section. Although the apparatus has been described with respect to a particular embodiment thereof, it is not to be so limited as changes and modifications may be made therein which are within the full intended scope of the invention as defined by the appended claims.

I claim:

1. A jig for cutting a magnetostrictive wire to a required length comprising, a base plate, a shaft defining an axis supported in spaced and parallel relation to one surface of said plate, a frequency measuring assembly mounted on said plate adjacent one side of said shaft to determine the resonant frequency of a wire workpiece, a cutter mounted on said plate adjacent the other side of said shaft to cut said workpiece to a desired length, a workholder including holding means slideably and rotatably mounted on said shaft for rotation between a first position and a second position, said holding means, said cutter and said frequency measuring assembly being equally spaced from said axis, said workholder in said first position being aligned with said measuring assembly and slideable axially of said shaft to operatively engage said assembly, a micrometer supported on said plate in alignment with said cutter, said workholder in said second position being aligned with and interposed between said micrometer and said cutter, said micrometer engageable with said workholder for sliding said workholder towards said cutter.

2. A frequency measuring and cutting assembly comprising, a base plate, an upright plate extending from said base plate, a shaft defining an axis extending from one side of said upright plate in spaced parallel relation to said base plate, said upright plate formed with a pair of openings equally and oppositely displaced from said shaft, a cutter disposed on the other side of said upright plate adjacent the first of said openings, a frequency measuring assembly disposed on the said other side of said upright plate adjacent the second of said openings to measure the frequency of the workpiece, a disc holding assembly slideably received on said shaft and pivotable transversely of said shaft to move the workpiece from said cutter to said frequency measuring assembly, clamping means on the end of said disc holding assembly adapted to hold the workpiece, a micrometer assembly including an axially movable micrometer head slideably received on said shaft, said micrometer head being aligned with the first of said openings and axially spaced therefrom, means for clamping said micrometer assembly to said base plate in a predetermined position, said micrometer head being engageable with said disc holding assembly when the said disc holding assembly is adjacent said cutter so as to position the workpiece relatively to said cutter.

3. An apparatus for cutting a wire so that it is resonant at a specified frequency comprising, a base member, an upright plate attached to said base member and formed with first and second spaced openings, a shaft defining an axis mounted on one side of upright plate between said openings, said shaft being spaced from said base member and extending parallel thereto, a cutter mounted on the other side of said upright plate adjacent said second opening, a frequency measuring assembly mounted on the said other side of upright plate adjacent said first opening, a first axially extending guide attached to said one side of said upright plate on one side of said shaft, a second axially extending guide attached to said one side of said upright plate on the other side of said shaft, a workholder assembly rotatably and slideably mounted on said shaft to hold a workpiece, said workholder assembly formed with a guide opening spaced from said shaft, said workholder assembly being rotatable to a first position in which said guide opening is aligned with said first guide for aligning said workpiece with said first opening and said frequency measuring assembly and being axially slideable thereat to operatively engage said first guide and guide opening, a micrometer holding assembly including an axially movable micrometer head spaced from said upright plate and aligned with said second opening and said cutter, a support mounted on said base member adjacent said micrometer holding assembly and formed with a slot, a thumb screw attached to said micrometer holding assembly and extending through said slot and adapted to lock the micrometer assembly to said support, said workholder assembly being rotatable to a second position in which said guide opening is aligned with said second guide for positioning said workpiece between said micrometer head and said cutter in alignment with said second opening, said workholder assembly being axially slideable at said second position and means for actuating said micrometer head for axially sliding said workholder assembly.

No references cited.